(12) United States Patent
Nakamura et al.

(10) Patent No.: US 8,351,144 B2
(45) Date of Patent: Jan. 8, 2013

(54) THERMALLY ASSISTED MAGNETIC RECORDING HEAD, RECORDING SYSTEM, AND RECORDING METHOD

(75) Inventors: Kimio Nakamura, Kanagawa (JP); Fumiko Akagi, Tokyo (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 582 days.

(21) Appl. No.: 12/072,004

(22) Filed: Feb. 21, 2008

(65) Prior Publication Data

US 2008/0204917 A1     Aug. 28, 2008

(30) Foreign Application Priority Data

Feb. 23, 2007 (JP) ................................. 2007-043766

(51) Int. Cl.
*G11B 5/02* (2006.01)
*G11B 11/00* (2006.01)

(52) U.S. Cl. ........................................ 360/59; 369/13.14

(58) Field of Classification Search .................. None
See application file for complete search history.

(56) References Cited

U.S. PATENT DOCUMENTS

| | | | | |
|---|---|---|---|---|
| 5,477,509 A | * | 12/1995 | Shibuya et al. | 369/13.22 |
| 5,787,292 A | * | 7/1998 | Ottesen et al. | 713/300 |
| 6,700,838 B1 | * | 3/2004 | McDaniel | 369/13.13 |
| 6,830,824 B2 | | 12/2004 | Kikitsu et al. | |
| 6,894,857 B2 | | 5/2005 | Kikitsu et al. | |
| 7,154,687 B2 | * | 12/2006 | Ikekame et al. | 360/46 |
| 7,221,538 B2 | * | 5/2007 | Kawato et al. | 360/125.04 |
| 2007/0243417 A1 | * | 10/2007 | Murakami et al. | 428/818 |

FOREIGN PATENT DOCUMENTS

| | | |
|---|---|---|
| JP | 2002-025011 A | 1/2002 |
| JP | 2002/175602 | 6/2002 |
| JP | 2003-045004 A | 2/2003 |
| JP | 2005/310369 | 11/2005 |

OTHER PUBLICATIONS

Cumpson et al. "A hybrid recording method using thermally assisted writing and flux sensitive detection," Magnetics Conference 2000, (INTERMAG 2000), HA-06 (Apr. 2000).

(Continued)

*Primary Examiner* — Daniell L Negron
(74) *Attorney, Agent, or Firm* — Zilka-Kotab, PC

(57) ABSTRACT

Embodiments of the present invention help to suppress the effects of thermal fluctuation in a thermally assisted magnetic field recording, and improve recording density. According to one embodiment, a recording area of a magnetic disk is heated and the full width at half maximum of an optical power distribution of a near field light generator is controlled to be 100 nm or less. Thereby, the cooling time of the magnetic disk is made 2 nm or less and the effects of thermal fluctuation are suppressed. Moreover, although an incomplete area of the magnetization reversal at the rear end of the magnetic domain is created with rapid cooling, by creating an overshoot at the rising end of the magnetic field waveform of the magnetic recording head, the incomplete area of the magnetization reversal can be overwritten, which is created at the rear end of the magnetic domain previously recorded by the overshoot magnetic field. Therefore, the expansion of the magnetic transition width can be suppressed, resulting in the recording density being improved.

20 Claims, 11 Drawing Sheets

OTHER PUBLICATIONS

Junichi et al. "Near field optical head with a surface plasmon resonance structure," Optics Japan 2002 Extended Abstracts, 3pA6 (2000).

Matsumoto et al., "Magnetic recording Properties of Magneto-Optical Media by Merge Type GMR Head,", Magnetics Conference 2000 (INTERMAG 2000), HA-04 (Apr. 2000).

Suzuki et al. "Magnetic head field over the air-bearing surface as visualized by the projection of a patterned electron beam," IEEE Transactions on Magnetics 36:3614-3617 (Sep. 2000).

Yoshida et al. "Influence of longitudinal bias field on magnetization distribution in magnetoresistive head with shield films," Journal of Applied Physics 75:1190-1200 (Jan. 1994).

* cited by examiner

THERMALLY ASSISTED MAGNETIC RECORDING HEAD, RECORDING SYSTEM, AND RECORDING METHOD

CROSS-REFERENCE TO RELATED APPLICATION

The instant nonprovisional patent application claims priority to Japanese Patent Application No. 2007-043766 filed Feb. 23, 2007 and which is incorporated by reference in its entirety herein for all purposes.

BACKGROUND OF THE INVENTION

There has been growing demand for improving the recording density of a magnetic disk device, which is a kind of information storage system mounted in a computer, with an increase in the amount of information which should be processed. In order to improve the recording density of a magnetic disk device, the size of the magnetic recording has been pushed finer. Thus, there have been attempts to make the distance between a magnetic disk and a magnetic head smaller, to make the grain size of the magnetic grains included in a magnetic recording layer of a magnetic disk finer, and to increase the magnetic coercivity (anisotropic field) of the magnetic disk.

However, there is a physical limitation to the increase in the magnetic field strength of a magnetic recording head, and this becomes a factor which limits an improvement in the magnetic recording density. Although, it is necessary for a high density recording to make the crystal grains of a magnetic disk finer in terms of noise reduction, a problem arises in that the magnetic grains become thermally unstable. Therefore, in order to make the crystal grains finer and further, to ensure the thermal stability, the magnetic anisotropic energy has to be increased. An increase in the magnetic anisotropic energy, that is, an increase in the anisotropic field (magnetic coercivity) requires an increase in the head field strength for recording. However, because of an upper limitation of the saturated magnetization of a magnetic pole material utilized for a recording head and a limitation for downsizing the distance between the magnetic disk and the magnetic head, it is difficult to increase the anisotropic field with an increase in the recording density and to increase the magnetic field strength from the magnetic head.

In order to solve the aforementioned problems, a thermally assisted magnetic recording technology which combines an optical recording technology with magnetic recording technology has been proposed and given attention. For instance, there is a technology described in InterMag 2000 HA-04 and HA-06. A magnetic read/write head used herein is one to which a mechanism for heating a disk has been added. During recording, the disk is heated by generation of an applied magnetic field, thereby, the disk magnetic coercivity is decreased. As a result, recording becomes easily performed even by a disk with high magnetic coercivity where recording was hardly performed in a magnetic head of the prior art because of insufficient recording magnetic field strength. Herein, a heat source using light utilizes a method where a laser beam is focused by a lens used for an optical recording. However, there is a limit to the increase in speed and recording density of a magnetic disk device because it is necessary to heat and cool a minute heating region rapidly. As a method to solve this, a method for generating a near field light has been proposed in Optics Japan 2002 Extended Abstracts, 3pA6 (2000), and Japanese Patent Application No. 2003-45004, and research has been carried out. There is a significant relationship between the width of the thermal power distribution and the speed of thermal diffusion and for high speed heating and cooling it is necessary to make the size for heating the magnetic disk smaller than the minimum spot size which can be focused by a lens. Moreover, as a magnetic disk configuration which is preferable for rapid cooling, it is effective to provide a heat sink layer composed of a material having a large thermal conductivity and to enhance the thermal diffusion. An MR (magnetoresistive type) head, which is used in a magnetic recording of the prior art, is used for reproducing. The aforementioned recording method is called a thermally assisted magnetic recording.

In a thermally assisted magnetic recording, thermal decay of magnetization which occurs right after recording is perceived as a problem for improvement of the recording density. There is a concern that thermal fluctuation will be accelerated by heating, that magnetization direction and magnetic domains recorded once will be deleted, and that there will be a failure of high density magnetic recording. As measures for this event, an approach is proposed in Japanese Patent Application No. 2005-310369 where a magnetic recording layer is combined with an exchange magnetic layer and the magnetic coercivity of the magnetic disk is rapidly increased in the cooling process to suppress the magnetization reversal by thermal fluctuation, that is, an introduction of a layer which has a function of switching of the exchange coupling force against the temperature. An approach is also proposed in Japanese Patent Publication No. 2002-175602 where the magnetization reversal by thermal fluctuation is suppressed by utilizing a magnetic field from a magnetic field generation mechanism from outside the magnetic recording head.

As described above, in a thermally assisted magnetic recording, a method for suppressing the magnetization reversal caused by thermal fluctuation has been conventionally proposed. However, it is difficult to avoid the effect of thermal fluctuation with an increase in the speed and recording density.

BRIEF SUMMARY OF THE INVENTION

Embodiments of the present invention help to suppress the effects of thermal fluctuation in a thermally assisted magnetic field recording, and to improve the recording density.

According to the particular embodiments disclosed in FIGS. 3 and 4, a recording area of a magnetic disk 21 is heated and the full width at half maximum of an optical power distribution of a near field light generator 33 is controlled to be 100 nm or less. Thereby, the cooling time of the magnetic disk 21 is made 2 nm or less and the effects of thermal fluctuation are suppressed. Moreover, although an incomplete area of the magnetization reversal at the rear end of the magnetic domain is created with rapid cooling, by creating an overshoot at the rising end of the magnetic field waveform of the magnetic recording head 35, the incomplete area of the magnetization reversal can be overwritten, which is created at the rear end of the magnetic domain previously recorded by the overshoot magnetic field. Therefore, the expansion of the magnetic transition width can be suppressed, resulting in the recording density being improved.

DETAILED DESCRIPTION OF THE INVENTION

Figure 1:
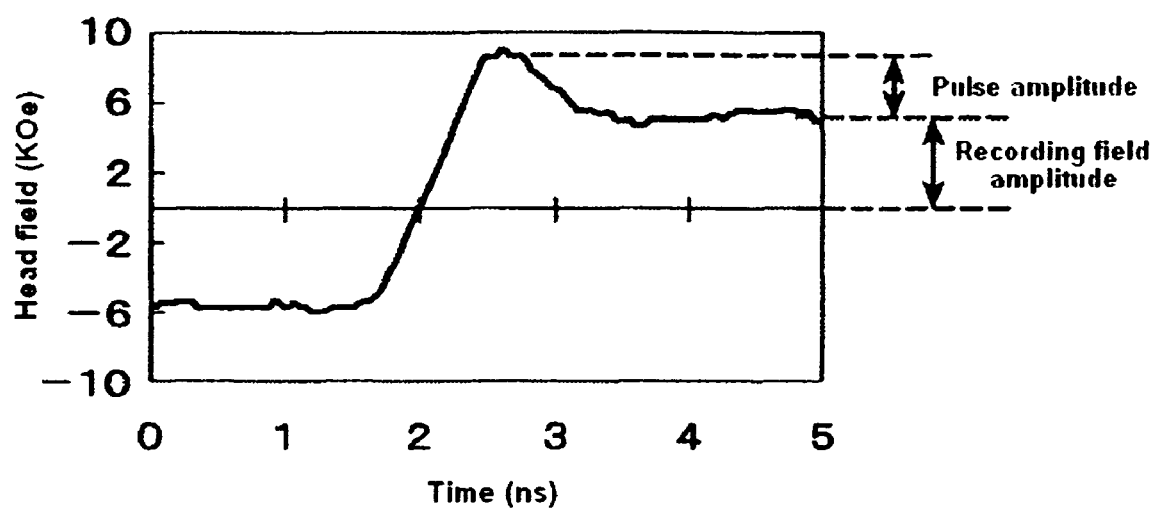
FIG. 1 is a drawing illustrating a magnetic field waveform having a pulse waveform in an embodiment of the present invention.

Embodiments of the present invention relate to a thermally assisted magnetic recording, and particularly to a thermally assisted magnetic recording head, a recording system, and a recording method provided for high density recording.

It is an objective of embodiments of the present invention to provide a thermally assisted magnetic recording head suitable for high density recording.

It is another objective of embodiments of the present invention to provide a thermally assisted recording system having a simple configuration which suppresses the influence of thermal fluctuation and makes it possible to improve the recording density.

It is a further objective of embodiments of the present invention to provide a thermally assisted recording method which suppresses the influence of thermal fluctuation and which enables high recording density.

A thermally assisted magnetic recording head of embodiments of the present invention has a magnetic recording head and a heat source of the magnetic disk, and an overshoot is created at a rising part or a falling part of the magnetic field waveform generated by the magnetic recording head, or at a rising part and a falling part of the magnetic field waveform generated by the magnetic recording head.

In a thermally assisted magnetic disk of embodiments of the present invention, in order to suppress thermal decay of magnetization after recording, the cooling rate of the magnetic disk is enhanced up to a level in excess of a magnetization reversal speed by thermal fluctuation. In other words, the magnetization reversal by thermal fluctuation is suppressed and their effects are avoided by making the cooling time of the magnetic disk shorter than the magnetization reversal time due to thermal fluctuation. The magnetization reversal time of the magnetic disk is about 400 ps (0.4 ns). Since the magnetic field applied to the magnetic disk by thermal fluctuation has a random direction, the frequency of the magnetization reversal due to thermal fluctuation becomes noticeable when thermal fluctuation continues for ten or more times than the magnetization reversal time. If the cooling time is defined as the time where the disk temperature decreases to a temperature level of 37% of the temperature range from the peak temperature, the frequency of magnetization reversal by thermal fluctuation can be decreased by making this cooling time 2 nm or less, resulting in the effects of thermal fluctuation being avoided. Moreover, if this cooling rate is achieved, a recording speed of 250 MHz or more can be achieved.

As described above, in order to increase the cooling rate, a magnetic disk configuration is needed where downsizing of the heat source and thermal diffusion are taken into consideration, but in order to achieve a cooling time of 2 ns or less a full width at half maximum of optical power distribution which heats the magnetic disk was controlled to be 100 nm or less. By using a heat source having this size, a magnetic disk where a cooling time of 2 ns or less is achieved can be structured and there is effectiveness in practice if a configuration is taken which includes a magnetic recording layer with a thickness of 20 nm or less, which is composed of an alloy material including a transition metal, and where a heat sink layer composed of a metallic material such as Ag, Au, Cu, Pd, Pt, and Ru, etc. having a thermal conductivity higher than the magnetic recording material.

Figure 2:
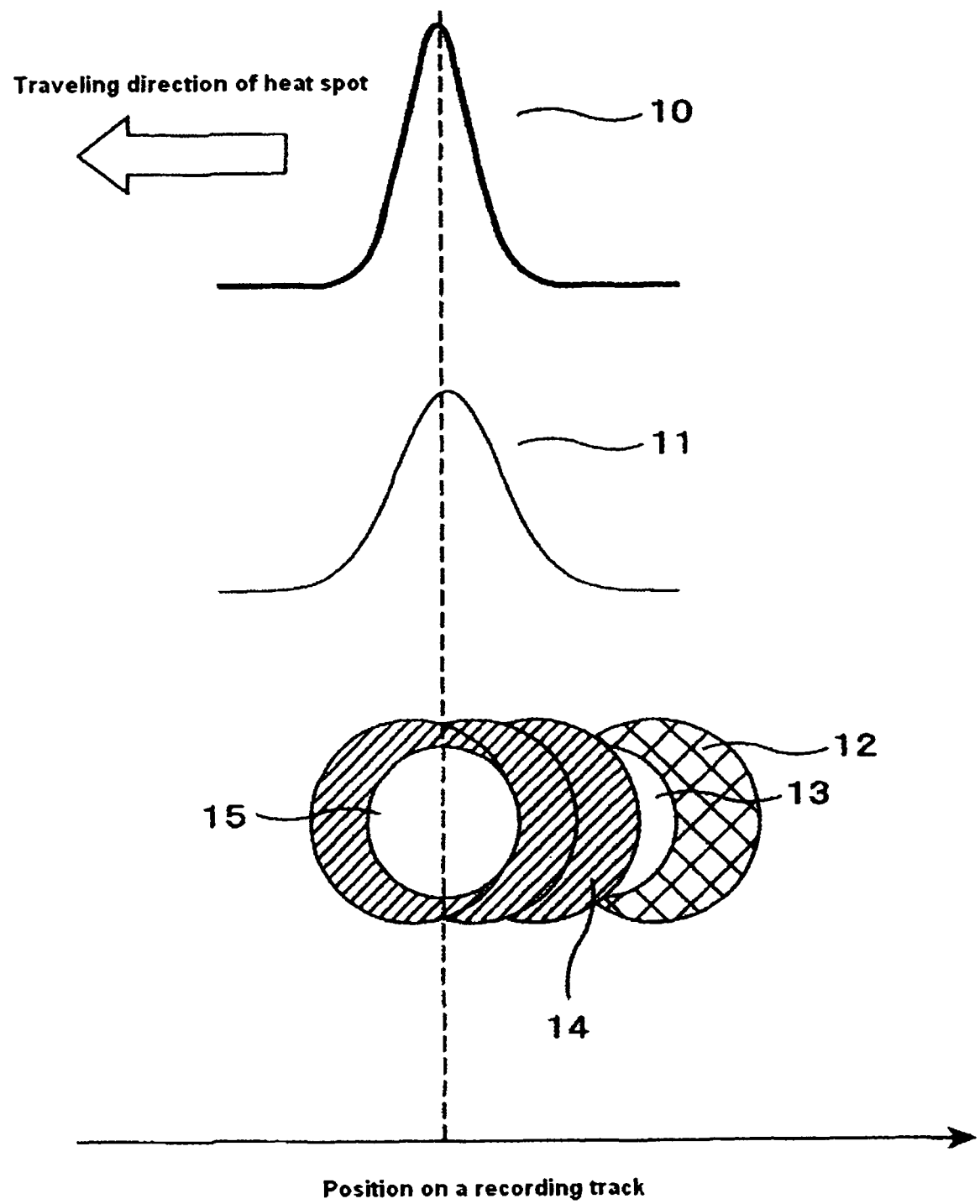
FIG. 2 is a drawing illustrating the creation of an area where magnetization reversal is not complete.

When the cooling time is decreased to 2 ns or less, a problem arises that the magnetization reversal is not complete at an edge of the recording domain. As shown in FIG. 2, in a thermally assisted magnetic recording, a magnetic disk is heated by using an optical power distribution 10 having a small full width at half maximum. Recording is performed in the cooling process by way of the magnetization loss region 15 at a high temperature part of the temperature distribution 11 of the heated magnetic disk, and, when sufficient magnetic energy is applied, the magnetization of the grains of the magnetic disk is reversed in the recording direction and pinned. On the other hand, in rapid cooling, since there is not enough time to apply the magnetic field in the magnetic grains at the position of the timing of the switching of the magnetic field waveform, the rear end of the magnetic domain 14 is pinned in the random magnetization direction along the easy axis while the magnetization direction lost by heating was not completely aligned in the direction of magnetic field waveform, and it becomes a region 13 in which magnetization reversal is not complete. It prevents a decrease in the recording transition width and it becomes a new factor preventing an improvement in the recording density. It is a problem peculiar to a thermally assisted magnetic recording with rapid cooling, which is different from thermal decay of magnetization after recording.

In usual magnetic recording, the recording area where magnetization reversal is possible, that is, the length of a write bubble, which is an area where the magnetic field waveform from the write head is higher than the dynamic magnetic coercivity of the magnetic disk, is sufficiently long, for instance 100 nm, against the magnetic domain length to be recorded, for instance 20 nm, so that the end part of the magnetic domain which has not completed magnetization reversal never appears because of a recording configuration where the end of the domain recorded ahead is always overwritten by the write bubble.

In a thermally assisted magnetic recording of embodiments of the present invention, the full width at half maximum of the thermal power distribution (optical power distribution) where the heat source heats the magnetic disk is 100 nm or less and recording is limited to a partial area of the backside in the cooling process in this heat power distribution. A write bubble is formed in the area where the magnetic field of the write head becomes higher than the magnetic coercivity of the magnetic disk and the thermal magnetic field which is a value where thermal fluctuation is converted to a practical magnetic field. There is a case where the write bubble length becomes the same as the domain length to be recorded, 10 nm. In this state, when the velocity becomes higher, the end of the magnetic recording domain previously recorded cannot be overwritten by the next magnetic recording domain at a timing of switching of the magnetic field waveform, resulting in a residual state where magnetization reversal at the end of the magnetic domain is not complete. Generally, the length of the write bubble has to be longer than the product of the velocity and the switching time of the magnetic field waveform. For instance, when the write bubble length is 10 nm and the switching time of the magnetic field waveform is 1 ns, a state remains where the magnetization reversal is not complete at the position of the timing of switching of the magnetic field waveform if the velocity becomes 10 m/s or more. Thus, creation of an area where magnetization reversal at the end of the magnetic domain is not complete becomes a critical problem with an increase in the velocity and a decrease in the area of the heat spot, and with an increase in the switching time of the magnetic field waveform.

In order to solve this new problem, in a thermally assisted magnetic recording of embodiments of the present invention, recording is performed by using a magnetic field waveform which applies a time span of a pulse magnetic field which is shorter than the time span of the recording pattern to a magnetic field waveform with a time span corresponding to the recording pattern. Magnetization reverse energy is supplemented by the pulse magnetic field in order to complete the magnetization reversal because it is necessary to apply magnetic field energy higher than a threshold. Since the pulse magnetic field added to the rising part of the magnetic field waveform enlarges the write bubble in the direction of the previously recorded magnetic domain, an area where magnetization reversal is not complete is overwritten and a factor for deterioration of the recording density is controlled. If it is decided that the outer edge of the write bubble is to overlap the steepest position of the temperature distribution, the steepest magnetic field transition can be achieved in the distribution of the magnetic field in the down track direction and the cross track direction, so that it is advantageous for improvement of the recording density. Therefore, when a pulse magnetic field is not applied and the amplitude of the magnetic field waveform is increased at a time span corresponding to the recording pattern, it is inconvenient because the application of magnetic field energy becomes excessive at the center part of the recording domain, and there is a possibility that cross track deletion will be provoked. Except for the rising part of the magnetic field waveform, this pulse magnetic field is applied to the falling part or both edges of the rising part and the falling part for adding the magnetic field energy, and it is also possible to suppress creation of an area where the magnetization reversal of the end of the magnetic recording domain is not complete.

In a magnetic recording of the prior art, a magnetization waveform is not used where a pulse waveform is added to the magnetic field waveform. Because of the necessity of generating a large magnetic field amplitude to perform high density magnetic recording, the magnetic recording head is driven by a current amplitude where the magnetic field amplitude is saturated. Therefore, even if the magnetic recording head is driven by a current waveform having overshoot, an overshoot will not appear in the magnetic waveform.

On the other hand, in a thermally assisted magnetic recording of embodiments of the present invention, the required magnetic field waveform amplitude is decreased by decreasing the disk magnetic coercivity during recording to an amplitude lower than the saturation value of the magnetic field waveform from the magnetic recording head. Therefore, it becomes possible to add a pulse magnetic field to the magnetic field waveform amplitude. For instance, using a magnetic recording head having a saturation magnetic field of 10 kOe (800 kA/m), and controlling the magnetic field waveform amplitude to be 5 kOe (400 kA/m), a pulse waveform of 5 kOe (400 kA/m) is added to this recording waveform.

In a thermally assisted recording system of embodiments of the present invention, a current waveform to which a pulse waveform is added is used for driving a magnetic recording head. Therefore, a recording current waveform generation circuit having a time span corresponding to the recording pattern and a pulse current waveform generation circuit are included thereto, and the magnetic head is driven by adding both waveforms. Moreover, since the appropriate pulse magnetic field amplitude changes with the recording speed and recording frequency, a control unit is included, which controls the pulse amplitude and the pulse time span of the pulse current waveform corresponding to the recording conditions such as the recording speed and the recording frequency. A laser emission waveform which is a heat source is driven by direct current or a pulse and, when it is driven by a pulse, the magnetic field waveform and the phase thereof are controlled.

According to embodiments of the present invention, a thermally assisted magnetic recording head suitable for high density recording is provided. Moreover, a thermally assisted magnetic storage having a simple configuration can be provided where the effect of thermal fluctuation is suppressed and an improvement of recording density is made possible. Moreover, a thermally assisted recording method is provided, which suppresses the effect of thermal fluctuation and which enables a high recording density.

Figure 3:
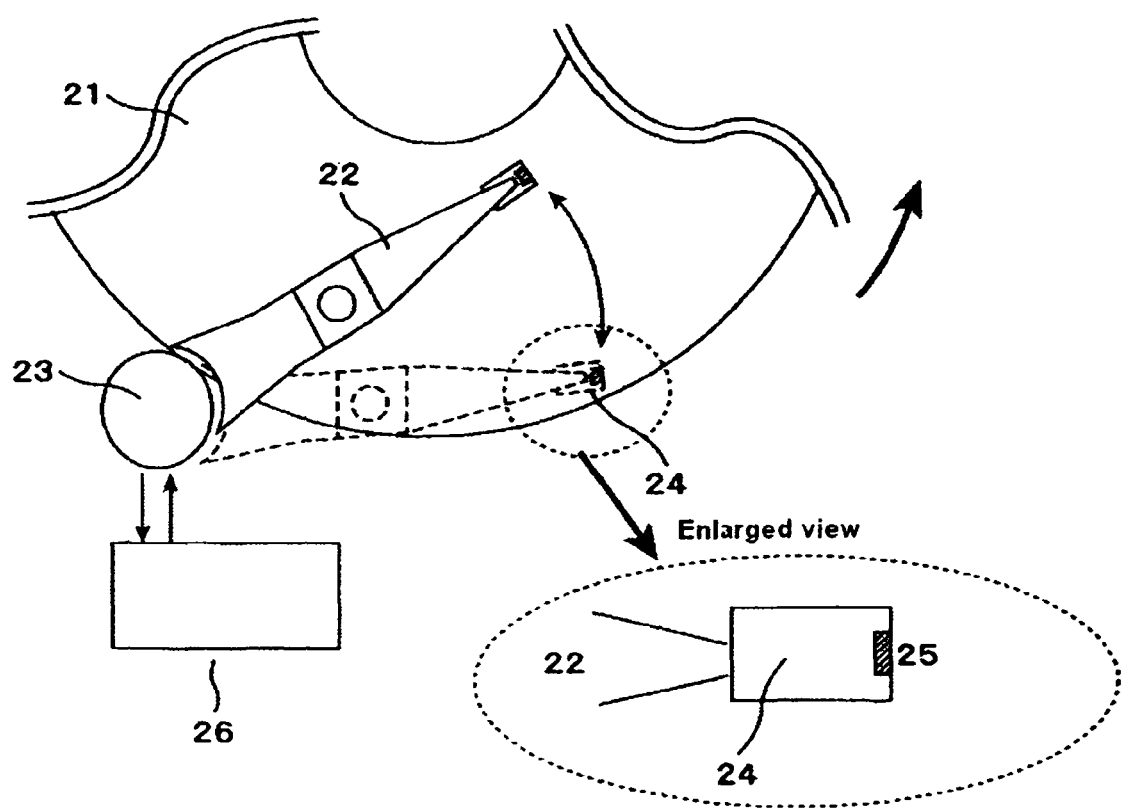
FIG. 3 is a schematic configurational drawing illustrating a recording system in an embodiment of the present invention.

Embodiments of the present invention will be described as follows. FIG. 3 is a schematic drawing illustrating a magnetic disk drive of an embodiment of the present invention. As main structural components, a magnetic disk drive includes a magnetic disk (magnetic disk) 21 which is mounted on a spindle and is rotary driven, a slider 24 which is mounted in a carriage 22, accesses an arbitrary track of the magnetic disk 21 by a voice coil motor 23, and has a magnetic head 25 reading/writing magnetic information, and a control circuit 26 which takes the control from an input/output of data to reading/writing and the voice coil motor 23.

Figure 4:
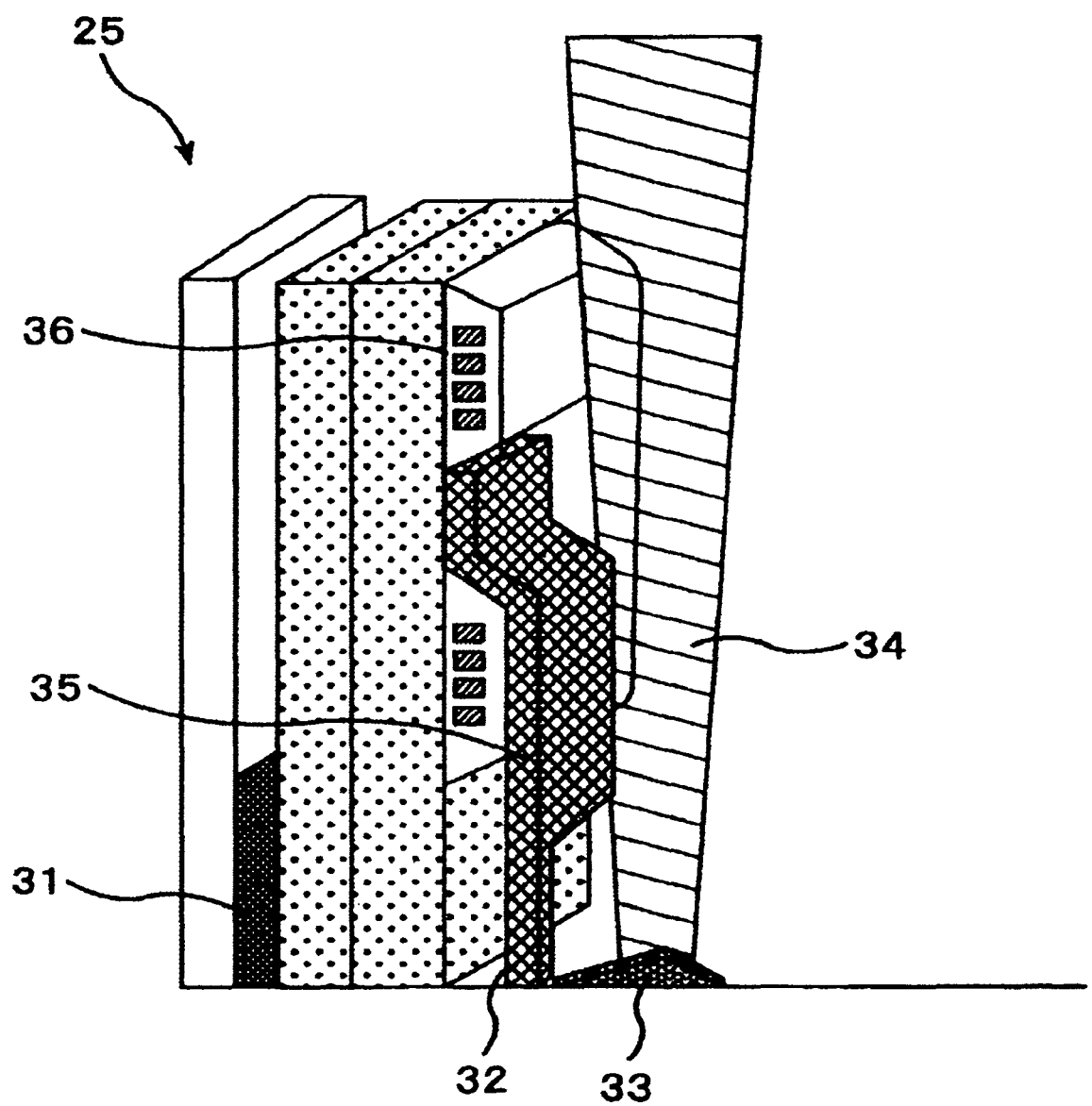
FIG. 4 is a configurational drawing illustrating a thermally assisted magnetic recording head in an embodiment of the present invention.

As shown in FIG. 4, the main structural elements of the magnetic head 25 are a read element 31, a magnetic recording head 32, a near field light generator 33 which is a heat source and generates minute recording heat sources, and a light introduction system 34. The read element 31 includes a magnetoresistive element, and the magnetic recording head 32 is a single-pole type magnetic recording head 35 which generates a magnetic field waveform by a current drive and generates a magnetic field of 10 kOe (800 kA/m) in maximum or less in the perpendicular direction at the near field photogeneration area.

Figure 5:
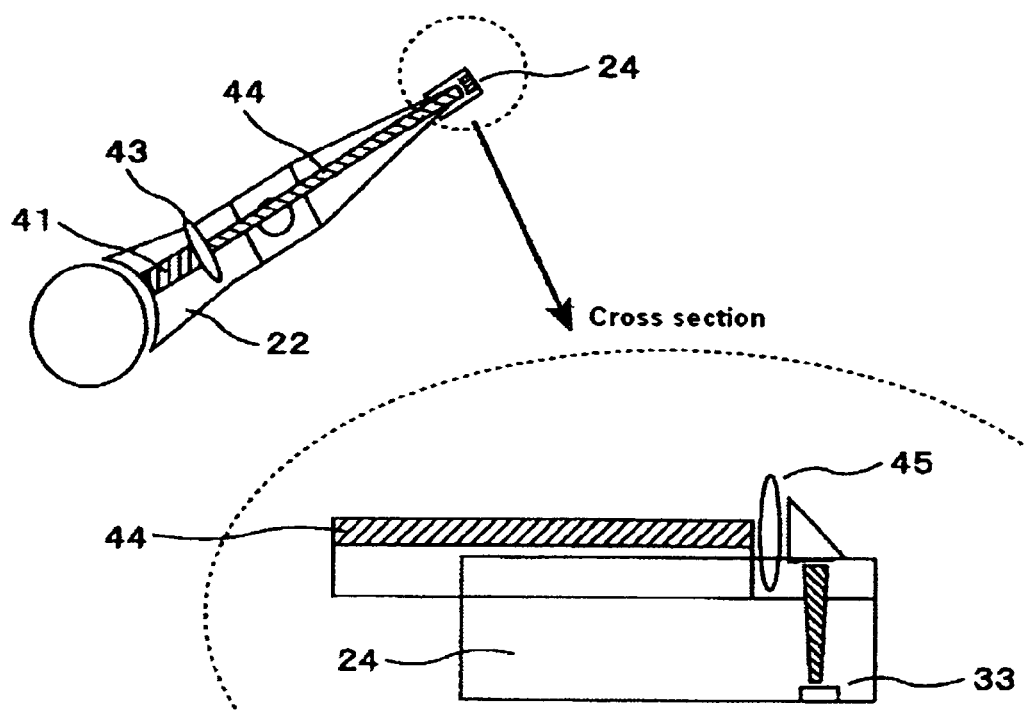
FIG. 5 is a configurational drawing illustrating a light introduction system of a thermally assisted magnetic recording head in an embodiment of the present invention.

As shown in FIG. 5, the light source consisting of a semiconductor laser 41 is placed over the carriage 22 and light is introduced into the near field light generator 33 through an optical coupler 43, an optical fiber 44, and a coupler lens 45 over the slider 24. The near field light generator 33 is an antenna type gold thin film element where near field light is generated at a minute area by using plasmon resonance. As a result, near field light with a full width at half maximum of 50 nm or less is generated. The semiconductor laser which is a light source may be loaded over the slider and it is possible to use a wave guide for light introduction to the near field light generator.

Figure 6:
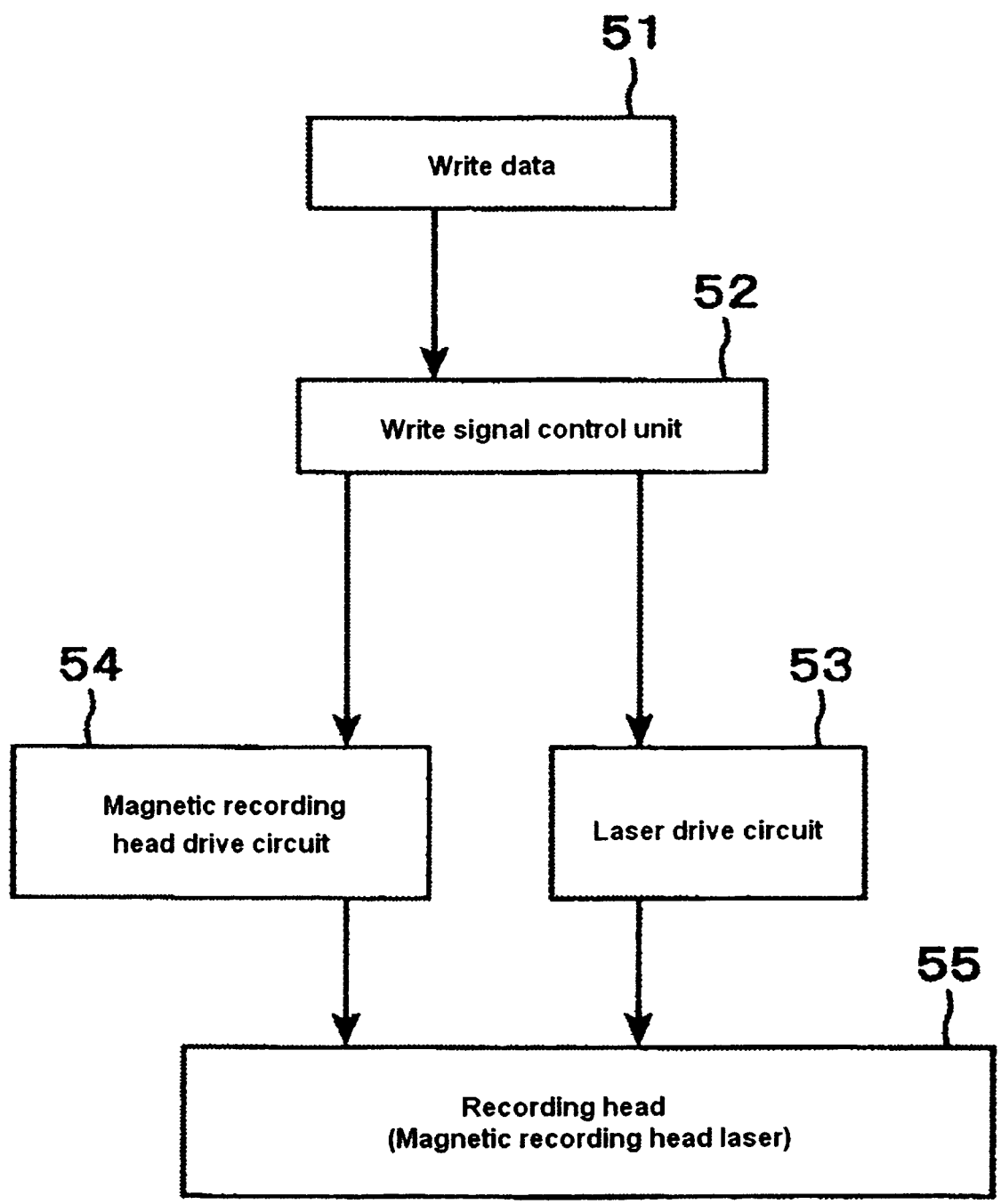
FIG. 6 is a block chart of a write control system of a thermally assisted recording system in an embodiment of the present invention.
Figure 7:
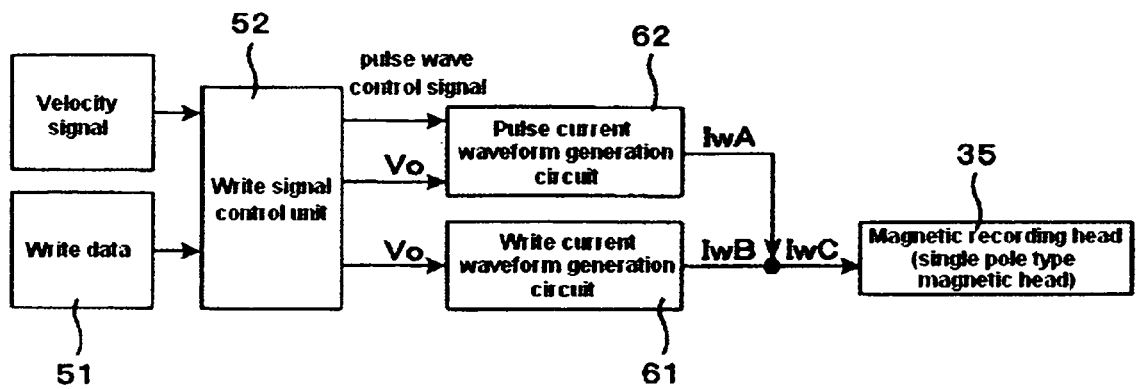
FIG. 7 is a drawing explaining a configuration of a magnetic recording head drive circuit and a write current waveform shown in FIG. 6.
Figure 7:
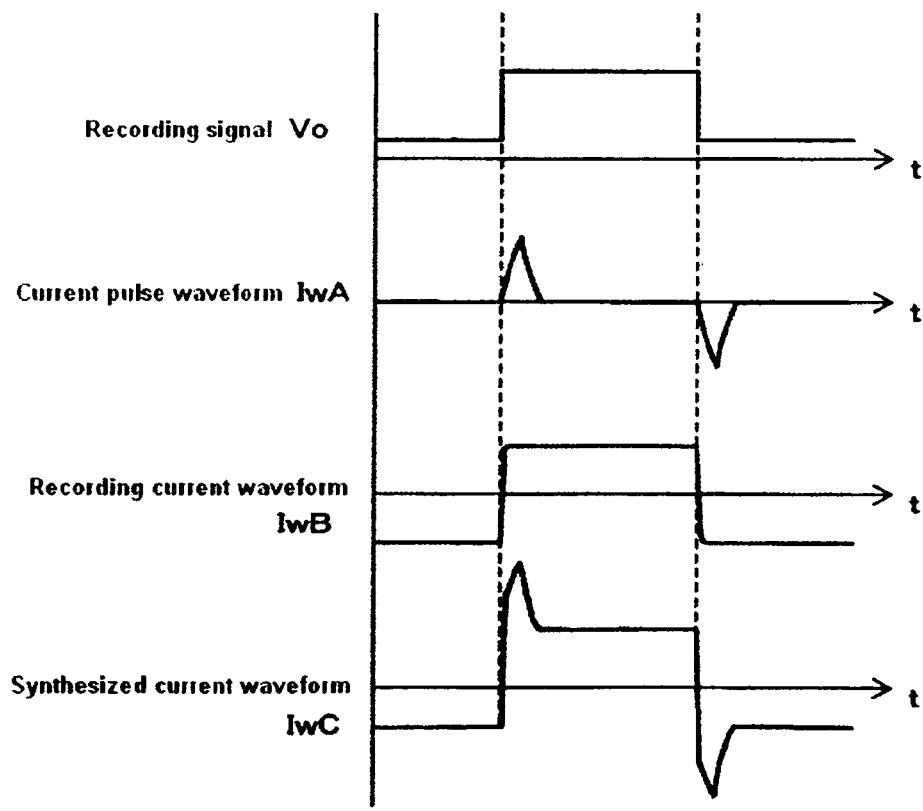

As shown in FIG. 6, based on write data 51, a recording pattern signal generated at a write signal control unit (control unit) 52 is given to a laser drive circuit 53 and a magnetic recording head drive circuit 54, and it is converted into the current waveform which drives the laser and the magnetic recording head, respectively. As shown in FIG. 7, the magnetic recording head drive circuit 54 includes a write current waveform generation circuit 61 and a pulse current waveform generation unit 62, and the write current waveform where both are synthesized is output to a coil of the magnetic recording head 35. A pulse waveform control signal is input to the pulse current waveform generation circuit 62 in addition to the recording pattern signal. This pulse waveform control signal is generated corresponding to the recording frequency and the velocity, and gives an amplitude of the pulse waveform and a pulse time span added to the write current waveform.

Hereinafter, a generated write current waveform and a measured value of the magnetic field waveform will be described. A transformer type ammeter inserted in the drive circuit is used for measuring the current waveform. Moreover, an electron beam tomography system was used for measuring the magnetic field waveform output from the magnetic recording head 35 (referring to IEEE Trans. Magn., vol. 36, pp. 3614-3617, 2000). The electron beam tomography system is an apparatus which irradiates an electron beam to the neighborhood of a magnetic pole of the magnetic recording head 35 placed inside of an electron microscope, measures the amount of track deflection of the electron beam passing through the head field, and measures the magnetic field strength. The electron beam is deflected by receiving a Lorentz force from the head field and, since the amount of track deflection is proportional to the integration of the magnetic field distributed along the track of the electron beam, the magnetic field strength in three-dimensions can be calculated by tomographically processing the measured amount of deflection.

Figure 8:
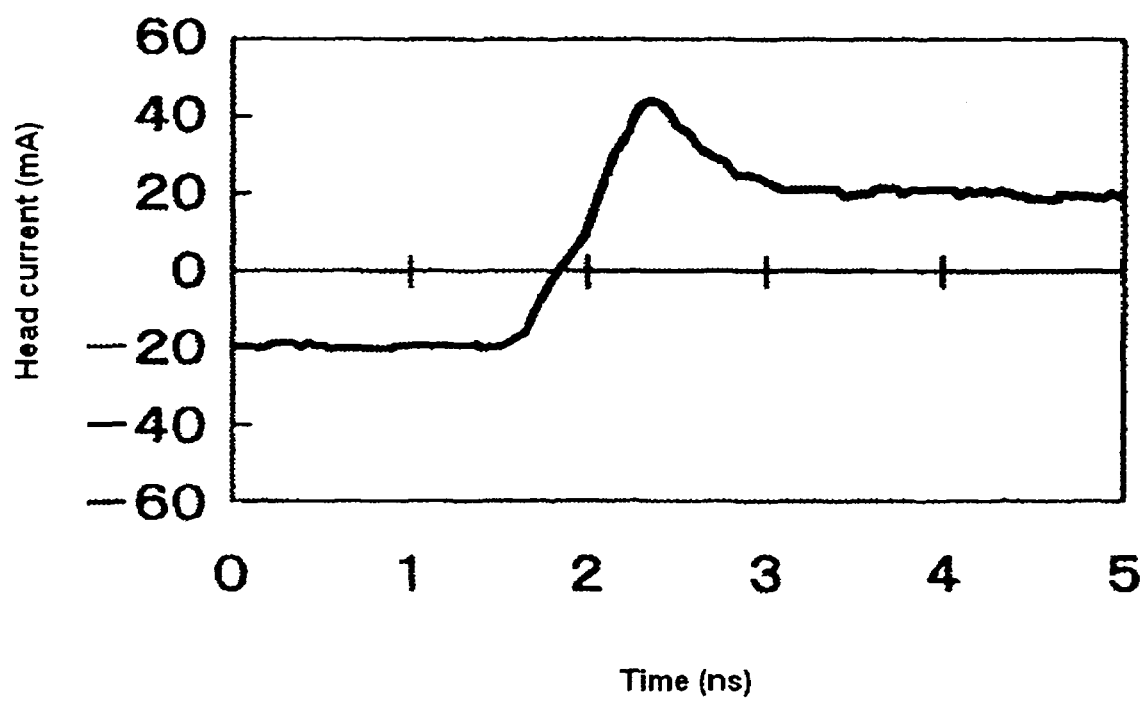
FIG. 8 is a drawing illustrating a write current waveform to which a pulse waveform of an embodiment of the present invention is added.

As shown in FIG. 8, by using the drive current waveform of the magnetic recording head 35 to which a pulse waveform is added, it was confirmed that a magnetic field waveform having a pulse waveform at the rising end of a wave was created as shown in FIG. 1. The reason why the shapes of the current waveform and the magnetic field waveform do not match each other is that there is a delay in the response time of the magnetic recording head 35 to the current. At this time, the amplitude of the magnetic field waveform was 6 kOe (480 kA/m) and the amplitude of the pulse part was 9.5 kOe (760 kA/m) against a drive current amplitude of 20 mA and an amplitude of the pulse current part of 40 mA. The magnetic field amplitude of this head is saturated with a current of 60 mA or more.

Figure 9:
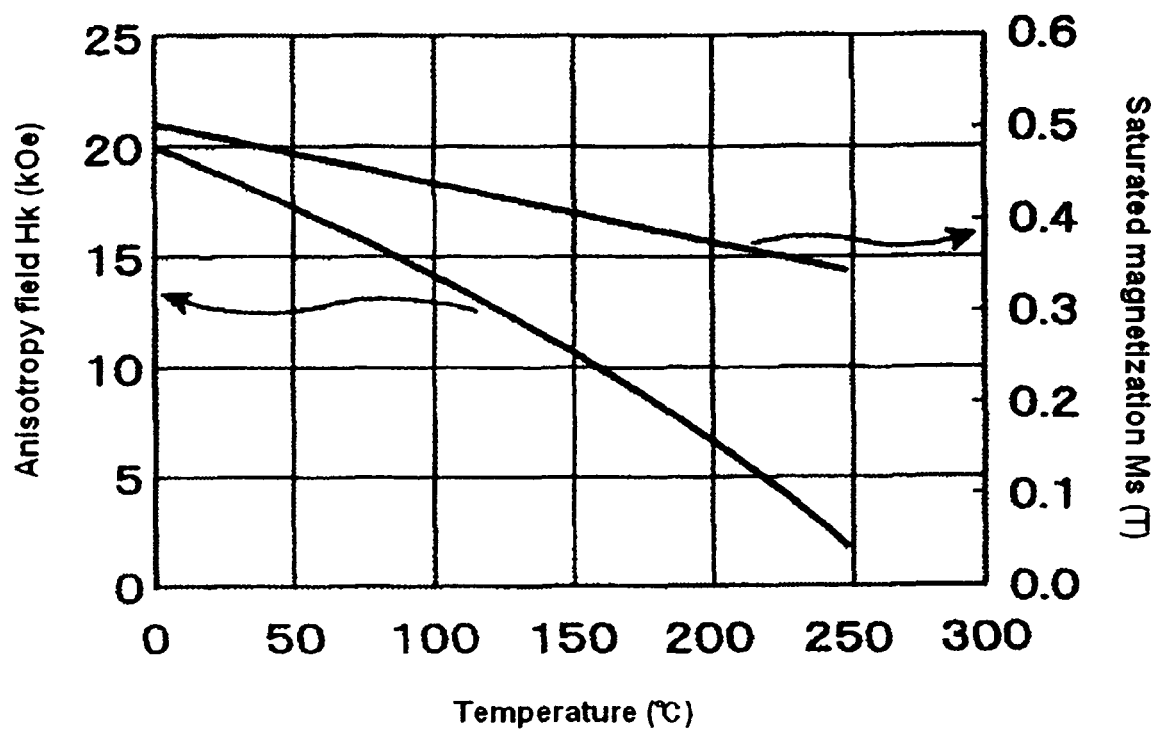
FIG. 9 shows a temperature dependence of the magnetic properties of a magnetic disk.

The main configuration of the magnetic disk 21 where a perpendicular magnetic recording layer is provided includes a NiAl underlayer over a glass substrate, a Ru layer which combines a crystal growth control layer for the magnetic recording layer with a heat sink layer, a CoCrPt alloy layer which will be the magnetic recording layer, and a protective layer. The film thickness of the magnetic recording layer is 16 nm, and the anisotropic field is 19 kOe (1520 kA/m) at room temperature (about 25° C.) as shown in FIG. 9 and it has a temperature property where it changes to 2 kOe (160 kA/m) at a recording temperature of 250° C.

Hereinafter, the effects of embodiments of the present invention will be shown by computer simulation using micromagnetics. Calculations were done by using Langevin equation (I) where a magnetic field h(t) caused by thermal energy is added to a Landau-Lifshitz-Gilbert equation as shown hereafter (referring to J. Appl. Phys. 75 (2), 15 Jan. 1994). Herein, M is the magnetization of a grain; t is time; $H_{eff}$ is an effective magnetic field; γ is the gyro-magnetic constant; α is a damping constant (extinction constant); $M_s$ is the saturated magnetization; h(t) is the effective magnetic field caused by thermal fluctuation; k is Boltzmann's constant; T is temperature; V is the volume of a grain; δ(τ) is Dirac's delta function; and τ is a time step. $δ_{ij}$ is Kronecker delta and i and j therein are elements of magnetic field (x, y, z). < > is the time mean.

[Equation 1]

$$\frac{dM}{dt} = -\gamma[M \times (H_{eff} + h(t))] + \frac{\alpha}{M}\left[M \times \frac{dM}{dt}\right] \quad (1)$$

[Equation 2]

$$<h_i(t)h_j(t+\tau)> = \frac{2kT\alpha}{\gamma VM_s}\delta(\tau)\delta_{ij} \quad (2)$$

[Equation 3]

$$<h_i(t)> = 0 \quad (3)$$

According to equations (2) and (3), it is assumed that the magnitude of h(t) applied to each grain follows a Gaussian distribution where the average is 0 and the coefficient (2 $kT\alpha/\gamma M_s$) of the right-hand side is the variance, and that the direction is a random vector. Moreover, according to equation (2), it was assumed that δ(τ) is an inverse number of the time step and that the magnitude of an effective magnetic field caused by thermal fluctuation applied to a grain changes with the time interval. The near field light distribution which became a heat source of the magnetic disk was obtained by using an electromagnetic field calculation and the heat distribution was obtained by a thermal diffusion calculation. A measured value was used for the magnetic field waveform. The grain size of the magnetic disk was controlled to be 4 nm and the values shown in FIG. 9 were used for the saturated magnetization $M_s$ and the temperature dependence of the anisotropic field Hk. The gap between the main pole and the disk was controlled to be 8 nm. And, the read signal and the noise were obtained from the level of recording magnetization over a track pitch of 40 nm.

Figure 10:
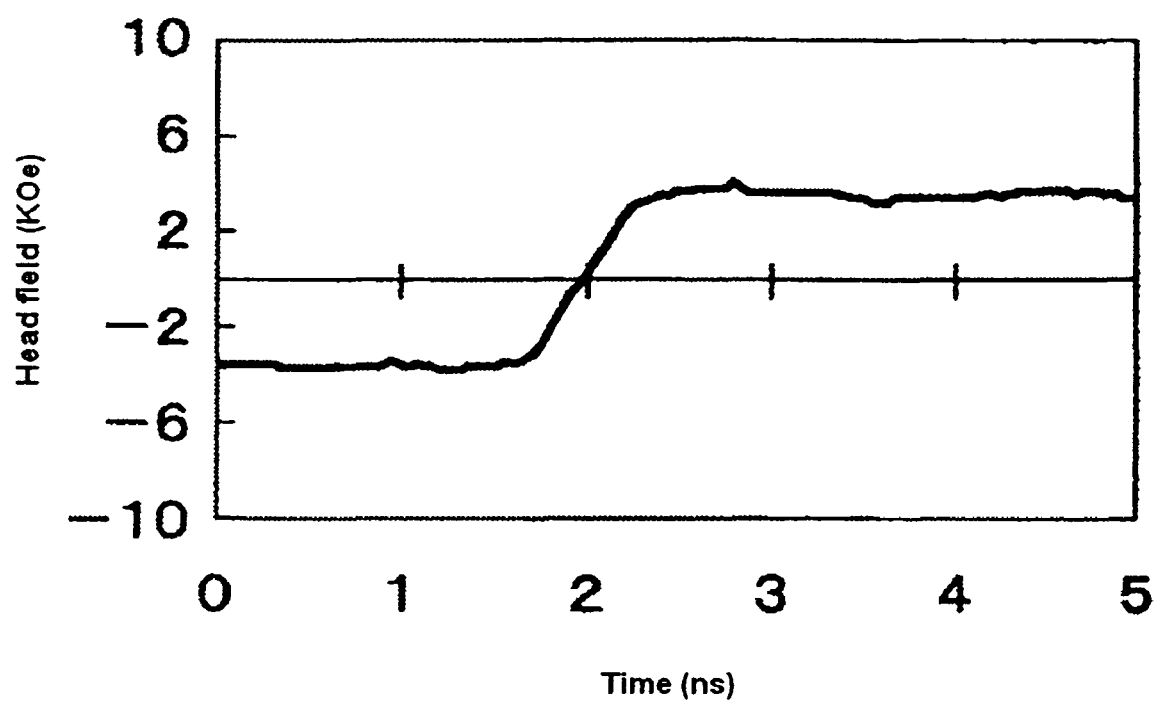
FIG. 10 is a drawing illustrating a write field waveform which does not have a pulse waveform.
Figure 11:
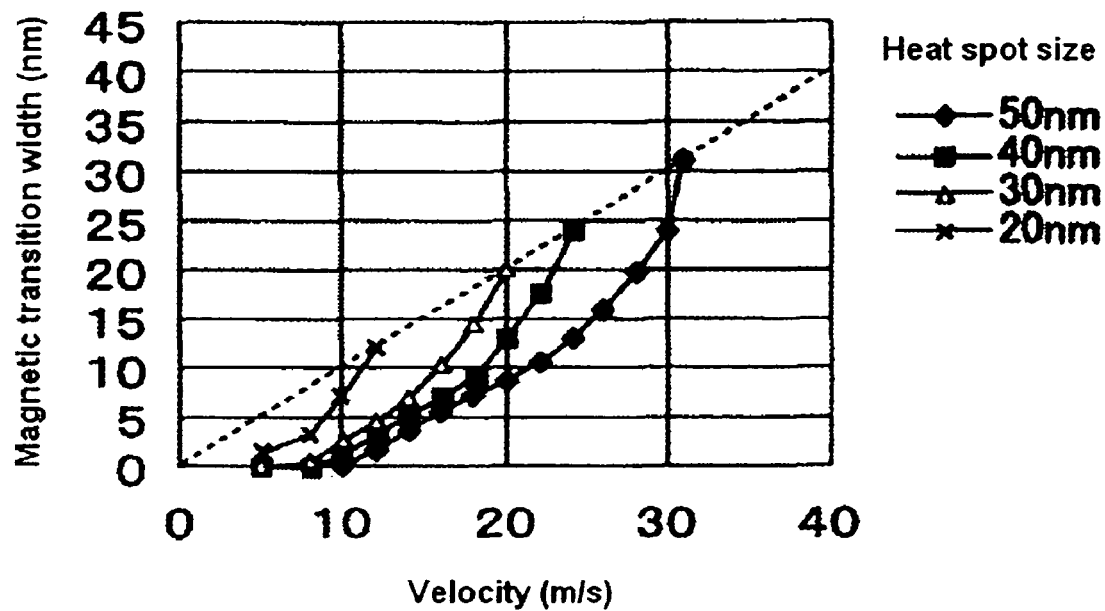
FIG. 11 shows relationships between the velocity and the magnetic transition width when recording is performed by a magnetic field waveform which does not have a pulse waveform shown in FIG. 10.

First of all, extension of the area where the magnetization reversal has not been complete at the rear end of the magnetic recording domain was studied when recording was done by a magnetic field waveform to which the pulse waveform shown in FIG. 10 was not added. The change of the magnetic transition width by creation of a non-recorded state was plotted against the velocity and the size of the heat distribution in FIG. 11. The magnetic transition width was noticeably increased with a decrease in the size of the heat distribution and with an increase in the velocity. As a result, the effects on the recording density could not be ignored when the size of the heat distribution was 30 nm and the velocity was 10 m/s or more.

Figure 12:
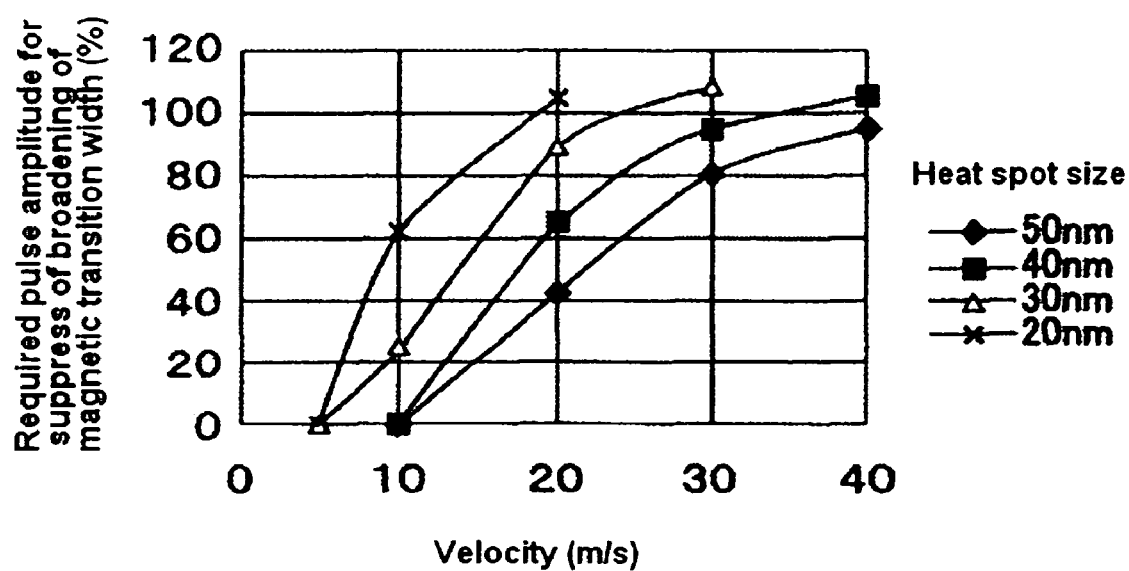
FIG. 12 shows relationships between a pulse amplitude ratio necessary for controlling expansion of the magnetic transition width and the velocity when recording is performed by a magnetic field waveform which has a pulse waveform shown in FIG. 1.

Next, a recording was performed by using a magnetic field waveform to which the pulse waveform of the embodiment shown in FIG. 1 was added, and the area where the magnetization reversal was not complete at the rear end of the magnetic recording domain was suppressed. The amplitude of the pulse magnetic field was changed to study the pulse amplitude necessary for controlling the extension of the magnetic transition width. As shown in FIG. 12, it is understood that an effect was obtained when the amplitude ratio of the pulse waveform amplitude against the magnetic field waveform amplitude was 10% or more. Moreover, since the necessary pulse amplitude changes with the velocity and the size of the heat distribution, it was confirmed that it is necessary to include a mechanism for controlling the pulse amplitude and to increase the pulse magnetic field amplitude with an increase in the velocity and a decrease in the size of the heat distribution.

As explained above, according to the aforementioned embodiment, a pulse magnetic field added to the rising end of the magnetic field waveform expands along the direction of the magnetic recording domain where the write bubble is previously written, so that it is possible to overwrite the area where magnetization reversal at the rear end of the magnetic recording domain is not complete and to control the expansion of the magnetic transition width. Specifically, since it is possible to exclude the area which does not contribute to recording, the recording frequency can be made higher, the write speed is made higher, and a high density recording can be achieved.

What is claimed is:

1. A thermally assisted magnetic recording system, comprising:
    a magnetic recording head;
    a control unit coupled to the magnetic recording head; and
    a heat source for heating a magnetic disk,
    wherein a falling part of a magnetic field waveform generated by said magnetic recording head, or the rising part and the falling part of the magnetic field waveform generated by said magnetic recording head, have an overshoot,
    wherein the control unit is configured to control an amplitude and time span of the overshoot based on a velocity of a magnetic disk when being written to by the magnetic recording head and a recording frequency.

2. A thermally assisted magnetic recording head, comprising:
    a magnetic recording head; and
    a heat source for heating a magnetic disk,
    wherein an overshoot is present at a rising part or a falling part of a magnetic field waveform generated by said magnetic recording head, or at the rising part and the falling part of the magnetic field waveform generated by said magnetic recording head,
    wherein an amplitude of said overshoot above an amplitude of a recording field of the magnetic recording head is 10% or more of the amplitude of the recording field of the magnetic recording head,
    wherein an amplitude and time span of the overshoot is based on a velocity of a magnetic disk when being written to by the magnetic recording head and a recording frequency.

3. The thermally assisted magnetic recording head according to claim 2, wherein a full width at half maximum of the thermal power distribution generated by said heat source is 100 nm or less.

4. The thermally assisted magnetic recording head according to claim 2, wherein said heat source is a nearfield photogeneration element and a full width at half maximum of generated optical power distribution is 100 nm or less.

5. The thermally assisted magnetic recording head according to claim 2, wherein said heat source is an antenna type gold thin film element.

6. The thermally assisted magnetic recording head according to claim 2, wherein a magnetic read element is provided adjacent to said magnetic recording head, wherein said magnetic recording head is a single pole magnetic recording head and said magnetic read element is a magnetoresistive effect element.

7. The thermally assisted magnetic recording head according to claim 6, wherein said magnetic recording head is a single pole magnetic recording head and said magnetic read element is a magnetoresistive effect element.

8. A thermally assisted recording system comprising:
    a magnetic disk,
    a heat source which heats a part of an area of said magnetic disk,
    a magnetic recording head where magnetic recording is performed by applying a magnetic field waveform to said magnetic disk,
    a driving circuit of said magnetic recording head, and
    a control unit for controlling said heat source and driving circuit,
    wherein a full width at half maximum of the thermal power distribution generated by said heat source is 100 nm or less,
    wherein a rising part or a falling part of the magnetic field waveform, or the rising part and the falling part of the magnetic field waveform, have an overshoot with a time span corresponding to a recording pattern generated by said magnetic recording head, and
    wherein said control unit controls the amplitude and time span of said overshoot based on the velocity of said magnetic disk and a recording frequency.

9. The thermally assisted recording system according to claim 8, wherein the amplitude of said overshoot is 10% or more of a recording field portion of said magnetic field waveform.

10. The thermally assisted recording system according to claim 8, wherein said driving circuit includes,
    a write current waveform generation circuit which generates a time span of a write current waveform corresponding to the recording.pattern, and
    a pulse current waveform generation circuit which generates a pulse current waveform which is added to a rising part or a falling part of the write current waveform generated by said write current waveform generation circuit, or to the rising part and the falling part of the write current waveform generated by said write current waveform generation circuit.

11. The thermally assisted recording system according to claim 8, wherein the amplitude and the pulse time span of a pulse current waveform generated by said pulse current waveform circuit is made variable corresponding to the velocity of said magnetic disk or to the recording frequency.

12. The thermally assisted recording system according to claim 8, wherein a magnetic read element is included adjacent to said magnetic recording head.

13. The thermally assisted recording system according to claim 8, wherein said heat source is a near field light generator and a full width at half maximum of the generated optical power distribution is 100 nm or less.

14. The thermally assisted recording system according to claim 8, wherein said magnetic disk includes a substrate, a heat sink layer formed over said substrate, a magnetic recording layer formed over said heat sink, and a protective layer formed over said magnetic recording layer.

15. The thermally assisted recording system according to claim 14, wherein said heat sink layer includes at least one metallic material selected from a group of Ag, Au, Cu, Pd, Pt and Ru.

16. The thermally assisted recording system according to claim 14, wherein said heat sink layer is formed of a Ru layer and also works as a crystal growth control layer of said magnetic recording layer.

17. A thermally assisted recording method comprising the steps of:
heating a part of an area of magnetic disk by a heat source; and
performing magnetic recording by a magnetic field waveform for a time span corresponding to a recording pattern from a magnetic recording head,
wherein a part of an area of said magnetic disk is heated by a thermal power distribution which is generated by said heat source and has a full width at half maximum of 100 nm or less,
wherein a rising part or a falling part of a magnetic field waveform, or the rising part and the falling part of the magnetic field waveform, have an overshoot with a time span corresponding to a recording pattern generated by said magnetic recording head, and
wherein a magnetic recording is performed in an area where said magnetic disk is heated by using a magnetic field waveform where the amplitude of said overshoot is 10% or more of the amplitude of a recording field portion of said magnetic field waveform,
wherein an amplitude and time span of the overshoot is based on a velocity of the magnetic disk and a recording frequency during the magnetic recording.

18. The thermally assisted recording method according to claim 17, wherein said overshoot is generated by applying a time span of a pulse magnetic field which is shorter than the time span of the recording pattern to a magnetic field waveform with a time span corresponding to said recording pattern.

19. The thermally assisted recording method according to claim 17, wherein a pulse waveform control signal is input to a pulse current waveform generation circuit to make the amplitude and the pulse time span of said pulse magnetic field variable corresponding to the velocity of the magnetic disk and to the recording frequency.

20. The thermally assisted recording method according to claim 17, wherein said heat source is a near field light generator and a full width at half maximum of the generated optical power distribution is 100 nm or less.

* * * * *